United States Patent [19]
Carbrey

[11] 3,961,140
[45] June 1, 1976

[54] LINE SWITCH CONTROLLER FOR A TIME-DIVISION SWITCHING SYSTEM

[75] Inventor: Robert Lawrence Carbrey, Boulder, Colo.

[73] Assignee: Bell Telephone Laboratories, Incorporated, Murray Hill, N.J.

[22] Filed: Mar. 21, 1975

[21] Appl. No.: 560,331

[52] U.S. Cl. ............................................ 179/15 AT
[51] Int. Cl.² ........................................... H04J 3/02
[58] Field of Search ......... 179/15 AT, 15 A, 15 AQ

[56] References Cited
UNITED STATES PATENTS

| | | | |
|---|---|---|---|
| 3,551,600 | 12/1970 | Berch............................ | 179/15 A |
| 3,742,147 | 6/1973 | Carbrey........................ | 179/15 AT |
| R28,097 | 8/1974 | Nordquist et al. ............ | 179/15 AQ |

*Primary Examiner*—Thomas W. Brown
*Attorney, Agent, or Firm*—Charles Scott Phelan; Roy C. Lipton

[57] ABSTRACT

A line switch controller for time division telephone switching systems incorporates the function of a time slot assignment memory. Time slots are defined by the repetitive numerical sequence produced by a local time slot counter in enumerating clock pulses. Line switch closures effecting the connection of parties via a time division bus are performed in response to the attainment of a predetermined count in presettable control counters each dedicated to a different line switch and enumerating clock pulses up to the same maximum enumeration of the time slot counter. Repetitive closure of a line switch in a particular time slot is achieved by setting the corresponding control counter to the predetermined count in that time slot. Quick access to time slot assignment information is attained through the inclusion of a binary multibit subtractor to take the difference between the time slot counter enumeration and the enumeration of a selected control counter. This difference corresponds to the time slot assignment of the party connected to the line switch which the selected control counter controls.

8 Claims, 4 Drawing Figures

LINE SWITCH CONTROLLER FOR A TIME-DIVISION SWITCHING SYSTEM

FIELD OF THE INVENTION

This invention relates generally to a time-division telephone switching system and in particular to a system having improved facilities for controlling the connection of line switches to a time-division bus during assigned time slots and for indicating the assignment of time slots.

BACKGROUND OF THE INVENTION

In time-division switching systems a plurality of calls are simultaneously accommodated by momentarily connecting via a time-division bus the parties involved in each call during that time slot assigned to that call. Each momentary connection is effected through the closure of a plurality of normally open line switches, each such switch being dedicated to a different party connected to the system. Typically, the closures required during each time slot are accomplished by a line switch controller in response to the enumeration of a recirculating time slot counter responsive to the pulses from a clock pulse source. Also, some form of memory is usually required to record which parties are connected during each time slot in order to permit ready control. Since the line switch controller is separate from the memory, an ambiguous situation can arise if a timing or memory error is made. For example, if the time slot assignment for a particular party is incorrectly entered in memory, the party is connected during a different time slot than expected by the system.

It is an object of this invention to eliminate ambiguous control situations arising in time-division switching systems having a separate line switch controller and assignment memory.

It is a further object of this invention to incorporate the line switch control and slot assignment memory functions in a single apparatus.

SUMMARY OF THE INVENTION

According to the invention, a resettable control counter enumerating clock pulses is dedicated to each line switch. Each control counter restarts its counting after achieving a maximum count equal to the number of time slots and is arranged to effect closure of the corresponding line switch in the time slot in which the counter's most significant bit experiences a 1-to-0 transition. Thus, proper line switch control is achieved by resetting each counter to all zeros in the time slot in which its corresponding line switch is to be closed, as determined by the time slot count. Thereafter, the counter will produce a most significant bit 1-to-0 transition each time the slot occurs, thereby closing the corresponding line switch.

The addition of a binary subtractor to the above control counter arrangement yields a convenient means for indicating slot assignments. The time slot counter enumeration is applied to the subtractor as a minuend and addressable control logic is provided whereby the enumeration of a selected control counter can be applied as the subtrahend. Inasmuch as each control counter is reset at a particular time slot counter enumeration to effect time slot assignment and since all counters are incremented by successive control pulses, the time slot counter enumeration differs from each control counter enumeration by a number equal to the time slot enumeration at which the control counter was reset. Thus, the difference between the time slot counter enumeration and any control counter enumeration indicates the time slot to which the control counter and its corresponding line switch have been assigned. Consequently, by properly addressing the control logic, the slot assignment of any party and therefore the corresponding call is readily determined.

It is a feature of this invention that each of a plurality of resettable control counters effects control of a different one of said line switches.

It is another feature of this invention that an arithmetic subtractor provides slot assignment information by subtracting the enumeration of a particular control counter from the time slot count.

BRIEF DESCRIPTION OF THE DRAWING

The aforementioned and other objects and features of the invention are better understood by reference to the drawing in which.

DETAILED DESCRIPTION

Figure 4:
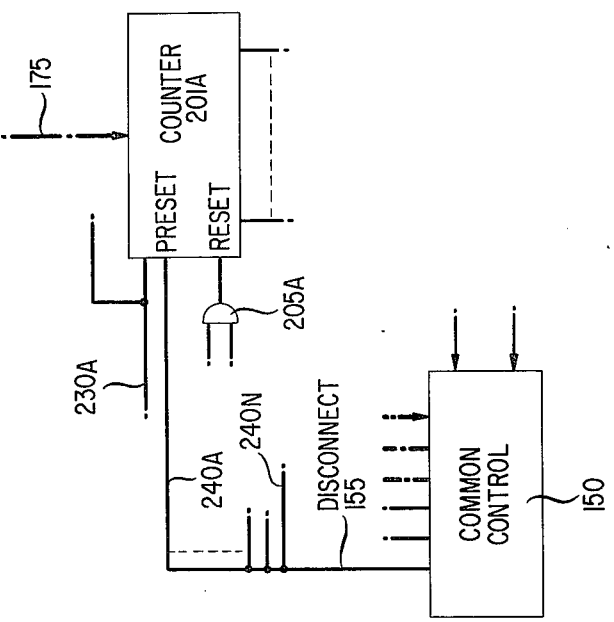
FIG. 4 illustrates how the configuration of FIG. 2 is modified to speed up disconnection of calls.

Throughout the drawing there are often pluralities of identical circuits and elements performing similar functions. To emphasize this identity and to facilitate reference to such identical components as a group, they all bear the same numerical designation but are assigned different alphabetic suffixes in order that individual components may be identified. Thus, an expression such as "stations 100" is a collective reference to the group of elements comprising a plurality of identical members, i.e., stations 100A through 100N.

Figure 1:
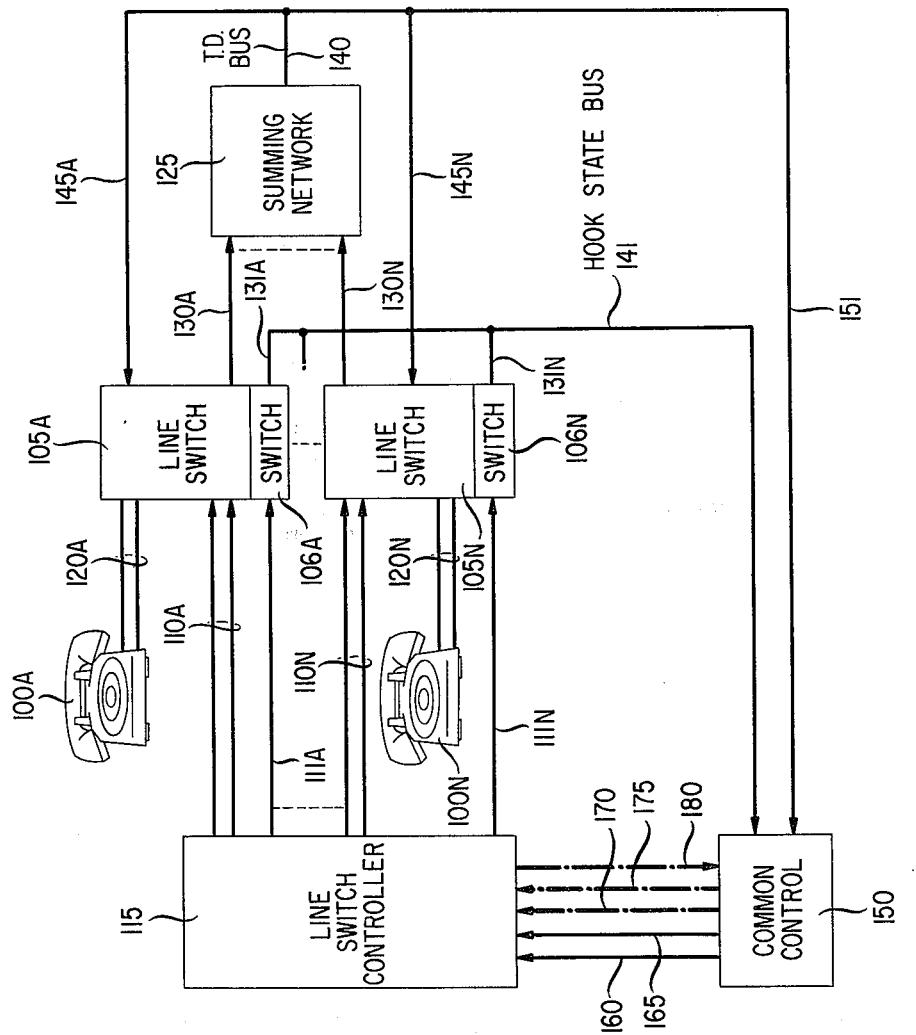
FIG. 1 is a functional block diagram demonstrating how the apparatus of the invention is employed.

FIG. 1 is a functional block diagram illustrating how the invention is used in a time-division switching system. The system of FIG. 1 permits unlimited conferencing among a plurality of stations 100, shown connected to the system for illustrative purposes by two-wire lines 120. Line switches 105 are a type of circuit that is known in the art. See, for example, line switches 101 in my own U.S. Pat. No. 3,804,989 issued on Apr. 16, 1974. Each of line switches 105 is dedicated to a unique one of stations 100 and is controlled via lead pairs 110 to permit intercommunication among stations. This intercommunication is achieved through the simultaneous closure of a plurality of line switches 105 in a common time slot. When one of line switches 105 is closed during a particular time slot, a sample of its station signal is produced on the corresponding one of leads 130, as indicated by a common alphabetic suffix in FIG. 1. Consequently, all simultaneously closed line switches produce samples on leads 130 during the time slot in which they are closed. These samples are added by summing network 125 which can be any conventional type of summing network, for example, an operational amplifier in the familiar summing configuration. The resulting sum sample is passed to time-division bus 140 and is returned to the line switches via leads 145. In each line switch the sample of the corresponding station is subtracted. This results in a new sample whose amplitude is equal to the sum of all samples occurring in the present time slot except that of the station corresponding to the line switch. The value of this sample is presented to the corresponding station until the next time that the present time slot occurs and the same line switch is again activated. Through this process, each station receives the signal which is equal to the sum of the signals of all other stations connected in the same time slot, and multiple conferencing results.

Switches 106 are controlled via leads 111 to permit transmission of the hook status (on-hook or off-hook) of the corresponding station as received via lines 120. As will be explained subsequently, only one of switches 106 may be closed at any time, so there is no question as to which station's hook status is present on hook state bus 141 at any given time. Switches 106 may be any type of transmission gates or AND gates.

Line switch controller 115 (to be described later) effects closure of individual ones of switches 106 via leads 111 and operates via lead pairs 110 to effect simultaneous closure, during assigned time slots, of groups of line switches 105 corresponding to the parties participating in a call. As previously explained, the sequence of these time slots is defined by a time slot count applied to line switch controller 115 via leads 175, schematically represented by a broken line (hereafter this will be the schematic representation for a group of lines). Naturally, this repetitive count sequence results in a repetitive sequence of line switch activations. Once a particular group of line switches has been assigned to a particular time slot, line switch controller 115 will continually activate that group of line switches in the given time slot. Time slots are assigned to each line switch in a group individually by applying an address corresponding to that line switch via leads 170 and simultaneously enabling an assignment by the signal on lead 165. When a particular time slot is so addressed via leads 170, line switch controller 115 also produces on leads 180 a number indicating the slot assignment of the addressed line switch and produces on lead 141 the hook state of the addressed station. The system clock is applied to line switch controller 115 via lead 160 and supplies the time reference for the operation of all internal logic circuits.

In FIG. 1, connections of the common control which are not directly related to line switch control have been eliminated.

The elements and functions of common control 150 are not considered to be part of the invention herein. However, the specific functions performed by the common control are discussed broadly to provide a more complete understanding of its interaction with line switch controller 115. Common control 150 incorporates all of the control functions normally found in a switching system with the exception of those functions specifically related to line switch control. Examples of such functions are ring control and detection, and dialing signal control and detection. The common control also includes some standard functional elements such as the system clock and a time slot counter which are coupled to line switch controller 115 via lead 160 and leads 175, respectively. Also included in common control 150 is equipment to perform the normal housekeeping functions which an operator would perform, such functions as determining unused time slots and deciding which time slot should be assigned to a waiting call. Consequently, common control 150 indicates to the line switch controller 115 via leads 170 that it wants access to a particular line switch, and that it wants that line switch assigned to a particular time slot via lead 165. The time slot assignment information received by the common control via leads 180 and the time-division bus signal received via lead 151 provide information necessary for housekeeping and control.

Line switch controller 115 could be employed in almost any time-division switching system. By way of example, a system in which it could be used is the one described in U.S. Pat. No. 3,870,826, issued on Mar. 11, 1975, of which patent I am a coinventor. The above described functions of common control 150 can be advantageously performed by various elements disclosed in the patent, which elements are shown in FIG. 1 of that patent and include processor 304, slot frame controller 303, memories 301 and 313, port address buffer 309 and tone generator 328. With respect to FIG. 6 of the patent, PIP 601, multiplexer 620, all zeros detector 616 and the control portion of hook selector 610 (the essential parts of line switch controller 316) would all be replaced by my present switch controller 115. Accordingly, the clock signal on my lead 160 would be provided from system clock 415, assign pulses (on my lead 165) would be provided via the WRITE lead of PIP logic 617, line switch addresses (on my leads 170) would be provided from port address buffer 309 via bus 320, and the time slot count (on my leads 175) would be provided from slot counter 303B via path 310. Furthermore, since my leads 180 provide a slot assignment indication, which also reflects the busy-idle state of a station, the busy-idle memory (BIM) portion of memory 305 in U.S. Pat. No. 3,870,826 may be omitted. The slot assignment indication also provides a useful check for correct operation; e.g., after a station is assigned to a slot if the slot assignment does not agree with the time slot counter enumeration, an alarm signal could be activated. Control of other processes, such as call transferring and setting up conferences, requires a knowledge of time slot assignment and will be simplified by the indication available on leads 180.

Figure 2:
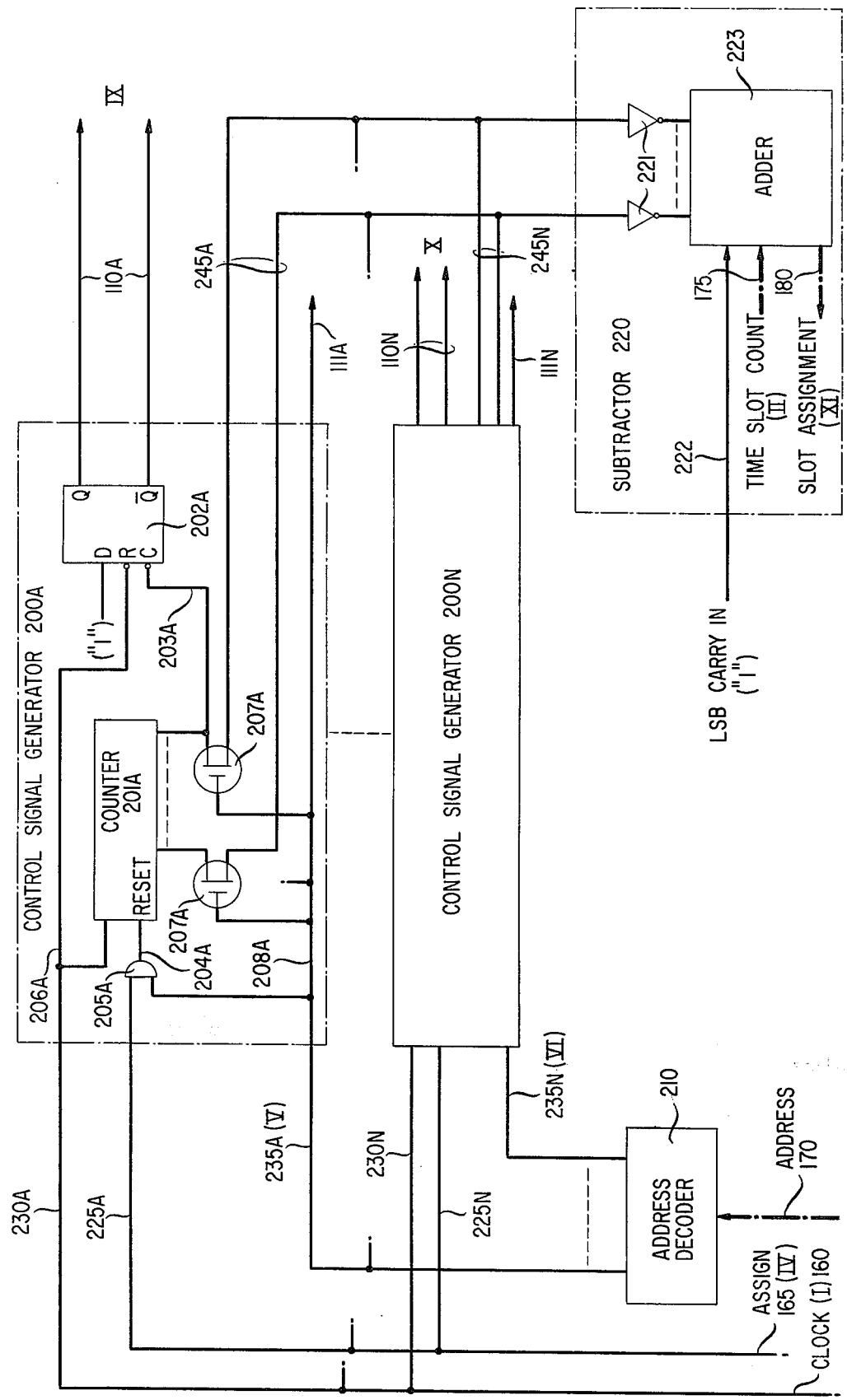
FIG. 2 is a logic diagram of an embodiment of the invention.

FIG. 2 is a logic diagram of an illustrative embodiment of line switch controller 115 of FIG. 1. Line switch controller 115 broadly comprises a plurality of control signal generators 200 each dedicated to a different one of stations 100, an address decoder 210, and a subtractor 220. Inasmuch as all of control signal generators 200 are identical, only generator 200A will be discussed in detail.

Figure 3:
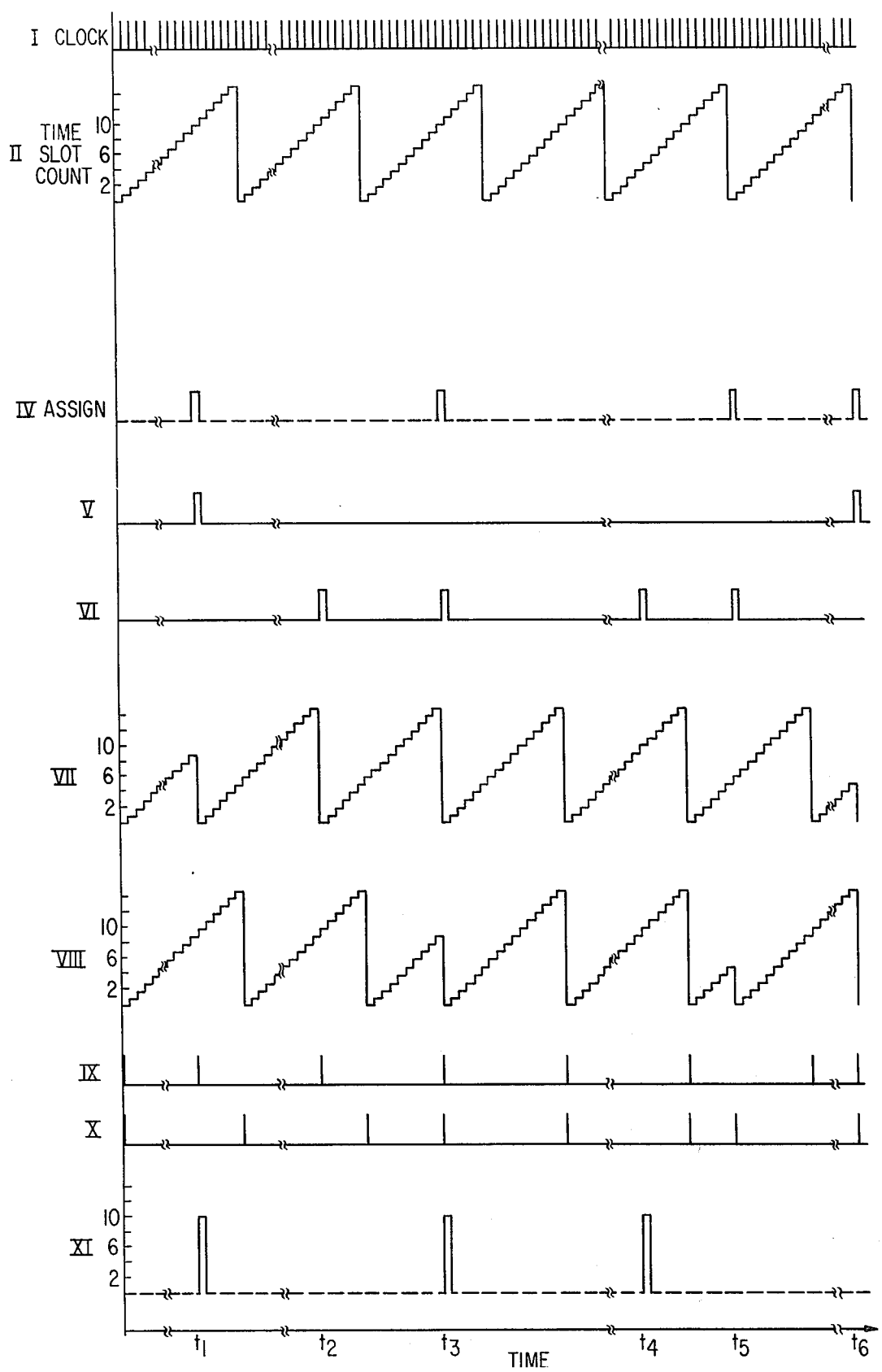
FIG. 3 is a waveform diagram helpful in explaining the illustrative embodiment of FIG. 2.

FIG. 3 is a waveform diagram useful in explaining the illustrative embodiment of FIG. 2. The various waveforms, having a common time base, have been labeled with Roman numerals. It should be noted that these numerals have been inserted into FIG. 2 at the places where these waveforms occur. Waveforms II, VII, VIII and XI are shown as signals having sixteen possible discrete levels, whereas all other illustrated waveforms are binary. Each of these levels is intended to represent a different possible enumeration of the system time slot count or one of counters 201 (to be described) driven by the system clock. Of course, limiting the system to sixteen enumerations means that only sixteen time slots are available. This choice of sixteen time slots was not intended as any kind of a limitation here, but was just made for convenience of illustration.

It should also be noted that the clock pulse waveform I is drawn as a series of impulses. In practice, the clock pulse waveform could be a rectangular wave but has been drawn as a series of pulses because of the difficulty of drawing narrow pulses in FIG. 3. For the same reason, the pulses in waveforms IX and X, which are the width of a clock pulse, are drawn as impulses. Pulses in all other waveforms have the duration of a full clock period. It should also be noted that the base lines in waveforms IV and XI are shown dashed. This is intended to signify that only the signals corresponding to control signal generators 200A and 200N have been shown and that all others have been omitted for convenience and ease of explanation. In practice, these waveforms would include a sequence of signals including samples from all control signal generators.

In response to different address words applied via leads 170, address decoder 210 produces an enabling signal for each of control signal generator 200 on different ones of leads 235. These enabling signals are also passed through control signal generators 200 and effect closure of hook switches 106 via leads 111. Inasmuch as each enabling signal is produced in response to a unique address word, only one of control signal generators 200 can be enabled at one time. The enable signals for control signal generators 200A and 200N are depicted, respectively, in waveforms V and VI. Decoders like 210 are known as binary to one-out-of-n decoders and are well known in the art.

Counter 201A is a conventional resettable binary counter having a maximum number of counts equal to the total number of time slots in the system. This counter is incremented by every clock pulse (waveform I) applied via leads 160 and 230A and resets automatically to the all-zeros count after achieving its maximum count, e.g., waveform VII at $t_2$. The counter is also externally reset to the all-zeros count through the application of a pulse on lead 204A by AND-gate 205A. This pulse is produced when control signal generator 200A is addressed via lead 235A (waveform V) and simultaneously receives an assign pulse (waveform IV) via leads 165 and 225A. Thus, counter 201A is externally reset at $t_1$ through simultaneous occurrence of pulses in waveforms IV and V.

The most significant bit from counter 201A is applied to the clock (C) input of flip-flop 202A via lead 203A. Flip-flop 202A is a conventional D flip-flop which assumes the state of the signal appearing on the D input on negative-going transitions of the signal applied at the C input. As indicated in FIG. 2, the D input is permanently wired high (logical 1), so the flip-flop is set every time the C input experiences a negative-going transition. The R input is a reset input which overrides the effect of the D and C inputs. The circle at the R input indicates that it is activated when a logical zero (low) is applied. The Q and Q outputs are the ordinary complementary outputs of a flip-flop, the Q output being in the logical one (high) state when the flip-flop is set. Clock pulses are coupled to the R input of flip-flop 202A via leads 230A and 206A, resetting the flip-flop at the end of each clock pulse. Consequently, flip-flop 202A produces on leads 110A complementary pulse pairs, each pair being initiated upon a resetting of counter 201A (upon reaching full count or in response to a reset pulse on lead 204A) and terminated by the end of a clock pulse on lead 213A. Waveform IX illustrates the positive ones of these pulse pairs. It should be understood that these positive pulses are accompanied by simultaneous negative pulses (momentary logical 0 condition) at the Q output.

Each time the most significant bit of counter 201A goes from one to zero, these pulse pairs enable the closure of line switches 105 in FIG. 1. It should be clear that once counter 201A is initially reset upon assignment of a particular time slot, a pulse pair will thereafter be produced on leads 110A during each recurrence of that time slot.

Insulated gate field effect transistors (IGFETs) 207A are employed in the well-known transmission gate mode to achieve readout of the enumeration of counter 201A. The drain of each of the IGFETs is connected to a different one of the output bits of counter 201A. The gates are connected to a common node which receives enabling signals (waveform V) from address decoder 210 via leads 235A and 208A when address corresponding to counter 201A is applied on leads 170. When an enabling signal (pulse) occurs, the count of counter 201A is produced on leads 245A. Thus, the enabling pulse in waveform V at $t_1$ produces the count of counter 201A on leads 245A and results in the occurrence of the counter's time slot assignment in waveform XI. The same enabling pulse effects the transmission of the hook state of the corresponding station to common control 150 via one of leads 111, one of hook switches 106, one of leads 131 and hook state bus 141. As has been explained previously, address decoder 210 is configured to enable only one of control signal generators 200 at a time, so that only a single control signal generator enumeration is applied to subtractor 220 at any time.

Subtractor 220 subtracts the enumeration of a selected one of control signal generators 200 applied via leads 245 from the time slot count applied via leads 175 to produce a time slot assignment indication on leads 180. Subtractor 220 performs the subtraction by adding the two's complement of the control signal generator enumeration to the time slot count. The two's complement of the number is conventionally generated by inverting every bit of that number and adding one to the inverted number at its least significant bit. In subtractor 220, the bits of the control signal generator are inverted by inverters 221. The one is conveniently added to the inverted bits via lead 222 at the same time that the overall addition is performed by adder 223. In FIG. 2, this is done by permanently wiring to a logical 1 level lead 222 which provides the least significant carry input bit. Adder 223 can be any conventional type of multibit binary adder.

It is readily demonstrated that subtractor 220 always produces, on leads 180, a number corresponding to the slot assignment of the addressed control signal generator. Inasmuch as when any of counters 201 is assigned to a particular time slot it is reset to zero, the instantaneous difference between the time slot count and the counter enumeration of any addressed counter will be equal to the assigned time slot for the corresponding subscriber line as long as the time slot counter does not reset. After the time slot counter resets, the difference becomes negative and subtractor 220 provides the two's complement of the positive difference (this positive difference is now the difference between the addressed counter enumeration and the time slot count, since the former now exceeds the latter). This means that, if the control signal generator applies the word X and the time slot counter applies the word Y and both of these words are n-bit words (the binary value of the most significant bit is $2^{n-1}$), the slot assignment appearing on leads 180, after a reset, is equal to $2^n - (X-Y)$, since the two's complement of an n-bit number is $2^n$ minus that number. This difference can be rewritten as $(2^n + Y) - X$, so that it appears that where the number X exceeds the number Y, the number Y is treated as if it had an additional bit more significant than its most significant bit; that is, as if the time slot counter had been able to keep counting rather than being reset. The difference produced, then, is the same number that has been produced all along for a positive difference. Therefore, the number appearing on leads 180 is indeed the time slot assignment number.

An example demonstrating the making, maintenance and breaking of a connection between stations 100A and 100N will best illustrate how the various components of line switch controller 115 cooperate. The waveforms of FIG. 3 are useful in explaining the example. At time O, both stations 100A and 100N are idle. It will be assumed that the zero time slot is assigned to idle stations, every station being assigned this slot after going on-hook. Thus, at time O, counters 201A and 201N are both synchronized (waveforms VII and VIII) to time slot count zero (waveform II), that is, they both reset on the zero time slot count. Subsequently, station 100A goes off-hook. Common control 150, as part of its normal search for service requests, sense the off-hook condition when switch 106A is closed at $t_1$ (here assumed to be a slot 10 instant with slot 10 vacant). To achieve this at $t_1$, common control 150 applies the address corresponding to station 100A on leads 170 which produces an enable pulse on lead 235A (waveform V); the presence of an off-hook results in the production of an assign pulse (waveform IV) on lead 165. This causes counter 201A to reset (wave-form VII), producing line switch closure pulses (wave-form IX) on lead pairs 110A, and subtractor 220 gives a slot assignment readout of 10 (waveform XI) on leads 180. Station 100A is now assigned to time slot 10 and its line switch is continuously activated at that slot. The slot assignment readout of 10 indicates to common control 150 that the assignment of station 100A to time slot 10 is completed.

Station 100A then receives a dial tone and proceeds to dial. When dialing is completed, common control 150 recognizes that station 100A is calling station 100N and, at $t_2$, interrogates station 100N to determine if it is idle or busy. Common control 150 accomplishes this at $t_2$ by applying the address corresponding to station 100N on leads 170 with the result that an enable pulse on lead 235N (waveform VI) accomplishes a readout of the slot assignment of control signal generator 200N on leads 180 (waveform XI) and the transmission of hook status via bus 141. The resultant zero value of slot assignment (waveform XI) at $t_2$ indicates that station 100N is idle and the on-hook indicates that it is not requesting service.

Inasmuch as station 100N was found to be idle, common control 150 produces station 100N's address on leads 170 accompanied by an assign pulse on lead 165 (waveform IV) upon the next occurrence of time slot 10 (at $t_3$). This causes counter 201N to reset (waveform VIII) with the resultant production of a line switch control pulse pair on lead pairs 110N (waveform X). The time slot assignment readout of 10 on leads 180 serves as an indication to common control 150 that the connection between stations 100A and 100N in time slot 10 has been completed.

The synchronism between the enumerations of counters 201A and 201N (waveforms VII and VIII respectively) between $t_3$ and $t_5$ indicates that stations 100A and 100N are connected. Throughout this interval common control 150 sequentially observes the hook status of each of stations 100 during idle time slots. At $t_4$ (a time slot 4 instant), after stations 100A and 100N have gone on-hook, the common control observes station 100N by applying its address to leads 170 and obtains a slot assignment readout and a transmission of hook status. The common control finds that station 100N has gone on-hook, the readout of 10 on leads 180 combined with an on-hook signal indicating that time slot 10 is to be vacated.

At the very next time slot O, instant $t_5$, counter 201N is reset through the simultaneous production of station 100N's address on leads 170 and an assign pulse (waveform IX) on lead 165, with the result that line switch control pulses are produced on lead pairs 110N (waveform X) and a slot assignment readout on leads 180. The slot assignment readout of O indicates to the common control that station 100N has been restored to the idle condition. Similarly, station 100A is found to be on-hook and is restored to the idle condition at time slot O, instant $t_6$. The O slot assignment readout received by the common control at $t_6$ indicates that time slot 10 has become vacant.

It should be noted that in the preceding example each of counters 201 was reset to the zero time slot when its corresponding station become idle. In each case, this necessitated waiting for the zero time slot to occur and, upon this occurrence, simultaneously applying the station's address on leads 170 and an assign pulse on lead 165. Inasmuch as only one address can appear on leads 170 at a time, only one of counters 201 can be reset at a time. Consequently, if there are a plurality of disconnections to be made, each must wait for a subsequent different occurrence of the zero time slot. This situation not only ties up time slots with calls waiting to be disconnected, but requires additional equipment to "remember" which stations require disconnection and to assign priorities to them. Operation is made considerably more efficient and a reduction in equipment realized by making each station assignable, on command, to the zero time slot whenever its address is produced by common control 150.

Such an advantage is achieved in the configuration of FIG. 2 with the modifications shown in FIG. 4 by using for the counters 201 the well-known presettable type counter which is set to an applied preset count when a pulse occurs at its preset input. The desired result is realized when the preset count corresponds to the time slot count appearing on leads 175 and common control 150 provides disconnect pulses in addition to the aforementioned address signals. In FIG. 4 disconnect pulses appear on lead 155 and are coupled to counters 201 via leads 240. Such disconnect pulses could be derived, for example, in the system of U.S. Pat. No. 3,870,826 by decoding the word on bus 317 corresponding to "disconnect" status. In operation, one of counters 201 is set to the time slot count when its address on leads 170 is accompanied by a disconnect pulse on lead 155. Being synchronized to the time slot count, it is assigned to the zero time slot. The appearance of the slot assignment readout O on leads 180 indicates to common control 150 that the commanded assignment to slot zero has taken place.

Although a specific embodiment of this invention has been shown and described, it will be understood that various modifications may be made without departing from the spirit and scope of the principle thereof.

What is claimed is:

1. In a time division switching system capable of accommodating a plurality of calls, each among a different plurality of parties, said system including a time division bus, a plurality of line switches each operative, upon closure, to connect a different one of said parties to said time division bus and means for repetitively producing a signal having a sequence of distinct values defining a sequence of time slots during each of which a different one of said calls is accommodated, the improvement comprising:
a plurality of means, each dedicated to one of said line switches, for generating a control signal having a selectable phase of said producing means signal, a predetermined value of said control signal being effective to close the corresponding line switch, and
means for subtracting from said producing means signal the control signal corresponding to the line switch of a particular party, the resulting difference corresponding to the time slot during which said party is accommodated.

2. The improvement of claim 1 further comprising:
means for selecting the control signal which is to be subtracted from said producing means signal, and
a plurality of activating means each responsive to the attainment of the predetermined value in a different one of said generating means to enable closure of the corresponding line switch.

3. In a time division switching system capable of accmmodating a plurality of calls, each among a different plurality of parties, said systems including a time division bus, a plurality of line switches each operative, upon closure, to connect a different one of said parties to said time division bus, a source of clock pulses and a time slot counter, responsive to clock pulses and operative to enumerate clock pulses up to a maximum enumeration which is one less than the number of time slots; the combination of:
a plurality of resettable counters each enumerating clock pulses up to a maximum enumeration coextensive with the maximum enumeration of said time slot counter,
a plurality of pulsing means each producing a control pulse in response to the attainment of a predetermined enumeration by a different one of said resettable counters, the control pulses from each pulsing means effecting closure of a different one of said line switches, and
means for subtracting from said time slot counter enumeration a selected one of said resettable counter enumerations.

4. The combination of claim 3 further comprising means for resetting a selectable one of said resettable counters.

5. The combination of claim 3 in which each of said counters further comprises means for presetting said counter enumeration to the instantaneous value of said time slot counter enumeration.

6. The combination of claim 3 in which said subtracting means employs two's complement arithmetic and comprises:
a binary full adder having first and second multibit binary inputs, a least significant carry bit input and a multibit sum output,
means for coupling said time slot counter enumeration to said first multibit input,
a plurality of inverters each coupling a different bit of said selected resettable counter enumeration to said second multibit input, and
means for coupling a constant "logical one" level to said least significant carry bit input.

7. In a time division telephone switching system including a plurality of line switches selectively actuable for coupling a corresponding plurality of subscriber stations to a time division bus during assigned time slots, said system including a source of clock pulses and means for producing a time slot count sequence defining said time slots, a controller for said line switches comprising:
a plurality of control signal generators comprising:
a resettable counter for counting clock pulses,
means, selectively actuable, for resetting said counter,
means, selectively actuable, for reading out the content of said counter, and
means responsive to the reinitialization of said counter from its full count for producing a pulse to one of said line switches, thereby activating said line switch,
means for subtracting from said time slot count sequence the output of one of said reading means,
means for applying outputs of said reading means in parallel to an input of said subtracting means, and
means for selecting said reading and resetting means of one of said generators in a time slot of said system.

8. The controller of claim 7 in which the counter in each of said control signal generators further comprises means for presetting said counter to the instantaneous value of said time slot count sequence.

* * * * *